United States Patent
Klun et al.

(10) Patent No.: US 11,065,855 B2
(45) Date of Patent: Jul. 20, 2021

(54) INFRARED-REFLECTING OPTICALLY TRANSPARENT ASSEMBLY AND METHOD OF MAKING THE SAME

(71) Applicant: 3M INNOVATIVE PROPERTIES COMPANY, St. Paul, MN (US)

(72) Inventors: Thomas P. Klun, Lakeville, MN (US); Richard J. Pokorny, Maplewood, MN (US); Benjamin R. Coonce, South St. Paul, MN (US); Douglas S. Dunn, Maplewood, MN (US); Gregg A. Ambur, River Falls, MN (US); Henry A. Kostalik, IV, Minneapolis, MN (US); John R. Jacobson, Newport, MN (US); Christopher S. DeGraw, Eagan, MN (US); Chunjie Zhang, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 254 days.

(21) Appl. No.: 16/468,808

(22) PCT Filed: Dec. 13, 2017

(86) PCT No.: PCT/US2017/066084
§ 371 (c)(1),
(2) Date: Jun. 12, 2019

(87) PCT Pub. No.: WO2018/147935
PCT Pub. Date: Aug. 16, 2018

(65) Prior Publication Data
US 2019/0310404 A1    Oct. 10, 2019

Related U.S. Application Data

(60) Provisional application No. 62/549,082, filed on Aug. 23, 2017, provisional application No. 62/435,607, filed on Dec. 16, 2016.

(51) Int. Cl.
*B32B 27/40* (2006.01)
*B32B 7/12* (2006.01)
(Continued)

(52) U.S. Cl.
CPC .............. *B32B 27/40* (2013.01); *B32B 7/023* (2019.01); *B32B 7/12* (2013.01); *B32B 27/06* (2013.01);
(Continued)

(58) Field of Classification Search
CPC ............. G02B 1/00–1/18; G02B 5/282; C09D 175/00–175/16; C09D 133/00–133/26;
(Continued)

(56) References Cited

U.S. PATENT DOCUMENTS

| 4,262,072 A | 4/1981 | Wendling |
| 5,233,465 A | 8/1993 | Wheatley |

(Continued)

FOREIGN PATENT DOCUMENTS

| CN | 2393118 | 8/2000 |
| CN | 101255289 A | 9/2008 |

(Continued)

OTHER PUBLICATIONS

"Polycarbonate-Wikipedia", [retrieved from the internet on Aug. 8, 2019], URL <http://en.wikipedia.org/wiki/Polycarbonate>, pp. 1-10.
(Continued)

*Primary Examiner* — Prashant J Khatri
(74) *Attorney, Agent, or Firm* — Bradford B. Wright (57) ABSTRACT

A method of making an infrared-reflecting optically transparent assembly comprises: coating a curable composition onto a major surface of an optically transparent thermoplastic polymer film; at least partially curing the curable composition, which may be optionally at least partially dried, to provide a thermoformable composite film; and laminating
(Continued)

the thermoformable composite film to an infrared-reflecting multilayer optical film to provide the infrared-reflecting optically transparent assembly. The curable composition comprises urethane (meth)acrylate compound, (meth)acrylate monomer, and silicone (meth)acrylate. The infrared-reflecting optically transparent assembly and methods of including it in an infrared-reflecting lens assembly are also disclosed.

20 Claims, 2 Drawing Sheets

(51) Int. Cl.
| | |
|---|---|
| *B32B 27/08* | (2006.01) |
| *B32B 27/36* | (2006.01) |
| *B32B 37/02* | (2006.01) |
| *C08G 77/442* | (2006.01) |
| *C08J 5/12* | (2006.01) |
| *G02B 5/28* | (2006.01) |
| *B32B 27/06* | (2006.01) |
| *C08G 18/78* | (2006.01) |
| *B32B 27/30* | (2006.01) |
| *G02B 5/26* | (2006.01) |
| *G02B 5/20* | (2006.01) |
| *B32B 27/26* | (2006.01) |
| *C09J 183/10* | (2006.01) |
| *C09D 183/12* | (2006.01) |
| *C09J 175/16* | (2006.01) |
| *C09D 183/10* | (2006.01) |
| *C08G 18/28* | (2006.01) |
| *C08G 18/79* | (2006.01) |
| *C08L 75/16* | (2006.01) |
| *C08J 7/043* | (2020.01) |
| *C08J 7/046* | (2020.01) |
| *C08F 290/06* | (2006.01) |
| *B32B 7/023* | (2019.01) |
| *G02B 1/04* | (2006.01) |
| *C08G 77/20* | (2006.01) |
| *C08F 283/00* | (2006.01) |
| *B32B 37/12* | (2006.01) |
| *C08G 77/46* | (2006.01) |

(52) U.S. Cl.
CPC .............. *B32B 27/08* (2013.01); *B32B 27/26* (2013.01); *B32B 27/308* (2013.01); *B32B 27/365* (2013.01); *B32B 37/02* (2013.01); *C08F 290/067* (2013.01); *C08G 18/285* (2013.01); *C08G 18/7831* (2013.01); *C08G 18/792* (2013.01); *C08G 77/442* (2013.01); *C08J 5/125* (2013.01); *C08J 7/043* (2020.01); *C08J 7/046* (2020.01); *C08L 75/16* (2013.01); *C09D 183/10* (2013.01); *C09D 183/12* (2013.01); *C09J 175/16* (2013.01); *C09J 183/10* (2013.01); *G02B 1/04* (2013.01); *G02B 5/208* (2013.01); *G02B 5/26* (2013.01); *G02B 5/282* (2013.01); *B32B 2037/1253* (2013.01); *B32B 2250/02* (2013.01); *B32B 2250/05* (2013.01); *B32B 2250/24* (2013.01); *B32B 2255/10* (2013.01); *B32B 2255/24* (2013.01); *B32B 2255/26* (2013.01); *B32B 2307/40* (2013.01); *B32B 2307/412* (2013.01); *B32B 2307/416* (2013.01); *B32B 2551/00* (2013.01); *B32B 2551/08* (2013.01); *C08F 283/008* (2013.01); *C08G 77/20* (2013.01); *C08G 77/46* (2013.01); *C08J 2369/00* (2013.01); *C08J 2483/10* (2013.01)

(58) Field of Classification Search
CPC ... B32B 7/00; B32B 7/14; B32B 27/00–27/42
See application file for complete search history.

(56) References Cited

U.S. PATENT DOCUMENTS

| | | |
|---|---|---|
| 5,360,659 A | 11/1994 | Arends |
| 5,882,774 A | 3/1999 | Jonza |
| 6,045,894 A | 4/2000 | Jonza |
| 6,049,419 A | 4/2000 | Wheatley |
| 6,228,499 B1 | 5/2001 | Nakauchi |
| 6,391,400 B1 * | 5/2002 | Russell .............. B32B 17/10201 428/34 |
| 6,451,414 B1 | 9/2002 | Wheatley |
| 6,667,095 B2 | 12/2003 | Wheatley |
| 6,676,859 B2 | 1/2004 | Hartley |
| 6,697,195 B2 | 2/2004 | Weber |
| 6,783,349 B2 | 8/2004 | Neavin |
| 6,788,463 B2 | 9/2004 | Merrill |
| 6,814,896 B2 | 11/2004 | Bhalakia |
| 6,927,900 B2 | 8/2005 | Liu |
| 6,951,681 B2 | 10/2005 | Hartley |
| 7,025,458 B2 | 4/2006 | Vu |
| 7,048,997 B2 | 5/2006 | Bhalakia |
| 7,271,951 B2 | 9/2007 | Weber |
| 7,629,379 B2 | 12/2009 | Wilson |
| 7,632,568 B2 | 12/2009 | Padiyath |
| 7,648,234 B2 | 1/2010 | Welchel |
| 7,652,736 B2 | 1/2010 | Padiyath |
| 7,718,264 B2 | 5/2010 | Klun |
| 7,952,805 B2 | 5/2011 | McGurran |
| 8,062,444 B2 | 11/2011 | Begon |
| 8,398,234 B2 | 3/2013 | Wang |
| 8,441,724 B2 | 5/2013 | You |
| 8,798,332 B2 | 8/2014 | Otis |
| 8,857,981 B2 | 10/2014 | Pletcher |
| 8,985,763 B1 | 3/2015 | Etzkorn |
| 9,017,819 B2 | 4/2015 | Kues |
| 9,266,998 B2 | 2/2016 | Kues |
| 9,739,916 B2 | 8/2017 | Weber |
| 2004/0080062 A1 | 4/2004 | Pope |
| 2004/0105072 A1 | 6/2004 | Qin |
| 2004/0126587 A1 | 7/2004 | Maki |
| 2005/0275943 A1 | 12/2005 | Sugimura |
| 2009/0004478 A1 * | 1/2009 | Baetzold .............. C09D 175/16 428/412 |
| 2009/0269568 A1 | 10/2009 | Kuhlmann |
| 2010/0003523 A1 | 1/2010 | Sharygin |
| 2010/0047974 A1 | 2/2010 | Lim |
| 2011/0096289 A1 | 4/2011 | Onizawa |
| 2012/0202911 A1 * | 8/2012 | Mitsuoka ............... C08G 18/73 522/33 |
| 2013/0091623 A1 | 4/2013 | McCulloch |
| 2013/0288052 A1 | 10/2013 | Taplo |
| 2013/0344290 A1 | 12/2013 | Yu |
| 2014/0004304 A1 | 1/2014 | Yu |
| 2014/0192311 A1 | 7/2014 | Pletcher |
| 2014/0374402 A1 | 12/2014 | Cornelius |
| 2015/0015847 A1 | 1/2015 | Bergman |
| 2015/0131047 A1 | 5/2015 | Saylor |
| 2015/0146166 A1 | 5/2015 | Weber |
| 2015/0268396 A1 | 9/2015 | Weber |
| 2016/0077361 A1 | 3/2016 | Wold |

FOREIGN PATENT DOCUMENTS

| | | |
|---|---|---|
| CN | 101687954 A | 3/2010 |
| CN | 104693993 A | 6/2015 |
| CN | 105273585 A | 1/2016 |
| CN | 105353431 A | 2/2016 |
| CN | 105820676 | 8/2016 |
| DE | 19645432 | 5/1998 |

(56) References Cited

FOREIGN PATENT DOCUMENTS

| EP | 0324081 | 7/1989 |
|----|---------|--------|
| JP | 2014-200943 | 10/2014 |
| WO | WO 03-078148 | 9/2003 |
| WO | WO 2005-123370 | 12/2005 |
| WO | WO 2008-013320 | 1/2008 |
| WO | WO 2009-004265 | 1/2009 |
| WO | WO 2010-064895 | 6/2010 |
| WO | WO 2014-110101 | 7/2014 |
| WO | WO 2014-210249 | 12/2014 |
| WO | WO 2015-065191 | 5/2015 |
| WO | WO 2015-080908 | 6/2015 |
| WO | WO 2017-039714 | 3/2017 |
| WO | WO 2017-113269 | 7/2017 |

OTHER PUBLICATIONS

Sutarlie, "Polymer Stabilized Cholesteric Liquid Crystal Arrays for Detecting Vaporous Amines", Analyst, The Royal Society of Chemistry, 2010, vol. 135, No. 07, pp. 1691-1696.

International Search Report for PCT International Application No. PCT/US2017/066084, dated Jan. 8, 2019, 5 pages.

* cited by examiner

INFRARED-REFLECTING OPTICALLY TRANSPARENT ASSEMBLY AND METHOD OF MAKING THE SAME

TECHNICAL FIELD

The present disclosure broadly relates to infrared-reflective optically transparent assemblies, articles including them, and methods of making the same.

BACKGROUND

The use of Multilayer Optical Films (MOFs) comprising multiple alternating layers of two or more polymers to reflect infrared electromagnetic radiation by appropriate choice of optical thickness of the layers is known in the art.

For example, U.S. Pat. No. 5,360,659 (Arends et al.) discloses a two-component multilayer film that reflects electromagnetic radiation in the infrared portion of the electromagnetic spectrum. The films may be laminated to substantially transparent plastics to provide infrared reflective properties. For example, windshields and canopies on certain aircraft are fabricated from tough polymeric resins. Laminating the optical interference film of the present invention to, or incorporating the film into, such protective layers would provide protection from infrared radiation while still providing substantial transparency to light in the visible region of the spectrum. The films themselves, as well as the plastics to which they are laminated may be shaped or post-formed into a variety of useful objects. Because the films suppress successive higher order reflections in the visible region of the spectrum, no iridescence or other undesirable color effects are present.

MOFs are prone to surface damage such as gouging and scuffing that may occur during handling and use. Such damage can detract from performance and/or aesthetic appearance of the MOF.

SUMMARY

It would be desirable to have materials and methods for protecting MOFs from physical damage such as, for example, gouging and/or scuffing. It would further be desirable that such materials and methods would be amenable to shaping and post-forming processes used to incorporate them into various articles.

Accordingly, in one aspect, the present disclosure provides a method of making an infrared-reflecting optically transparent assembly, the method comprising steps:

i) providing a curable composition comprising components:
  a) 70 to 95 weight percent of urethane (meth)acrylate compound having an average (meth)acrylate functionality of 3 to 9, based on the total weight of components a) to d);
  b) 2 to 20 weight percent (meth)acrylate monomer having a (meth)acrylate functionality of 1 to 2, based on the total weight of components a) to d);
  c) 0.5 to 2 weight percent of silicone (meth)acrylate, based on the total weight of components a) to d);
  d) optional effective amount of photoinitiator; and
  e) optional solvent;

ii) coating the curable composition onto a major surface of an optically transparent thermoplastic polymer film;

iii) optionally at least partially drying the curable composition to provide an at least partially dried curable composition;

iv) at least partially curing the curable composition or the at least partially dried curable composition to provide a thermoformable composite film; and v) laminating the thermoformable composite film to an infrared-reflecting multilayer optical film to provide the infrared-reflecting optically transparent assembly.

In another aspect, the present disclosure provides an infrared-reflecting optically transparent assembly comprising:

a first optically transparent thermoplastic polymer film having first and second opposed major surfaces;

a first protective coating disposed on at least a portion of the first major surface of the first optically transparent thermoplastic polymer film, wherein the first protective coating comprises an at least partially cured first composition comprising:
  a) 70 to 95 weight percent of urethane (meth)acrylate compound having an average (meth)acrylate functionality of 3 to 9, based on the total weight of components a) to d);
  b) 2 to 20 weight percent (meth)acrylate monomer having a (meth)acrylate functionality of 1 to 2, based on the total weight of components a) to d), wherein the (meth)acrylate monomer is not a urethane (meth)acrylate compound;
  c) 0.5 to 2 weight percent of silicone (meth)acrylate, based on the total weight of components a) to d); and
  d) optional effective amount of photoinitiator; and a first major surface of an infrared-reflecting multilayer optical film securely bonded to at least a portion of the second major surface of the first optically transparent thermoplastic polymer film.

In some embodiments, the infrared-reflecting optically transparent assembly further comprises:

a second optically transparent thermoplastic polymer film securely bonded to a second major surface of the infrared-reflecting multilayer optical film opposite the first optically transparent thermoplastic polymer film.

In yet another aspect, the present disclosure provides a method of making an infrared-reflecting lens assembly, the method comprising steps:

placing an infrared-reflecting optically transparent assembly according to the present disclosure into a lens-shaped injection mold cavity;

injecting molten thermoplastic polymer into the injection mold cavity; and removing the infrared-reflecting lens assembly from the injection mold cavity.

In yet another aspect, the present disclosure provides an infrared-reflecting lens assembly comprising an infrared-reflecting optically transparent assembly according to the present disclosure secured to a thermoplastic polymer lens.

Infrared-reflecting optically transparent assemblies according to the present disclosure are resistant to gouging and/or scuffing of the MOF film and may be suitable for use in preparing infrared-reflecting optically transparent assemblies such as, for example, visors, goggles, and/or safety glasses. Advantageously, infrared-reflecting optically transparent assemblies according to the present disclosure are suitable for use in shaping and post-forming processes used to incorporate them into the abovementioned various articles.

As used herein:

The prefix "(meth)acryl" refers to methacryl and/or acryl;

"infrared-reflecting" means at least 50 percent (e.g., at least 60 percent, at least 70 percent, at least 80 percent, at least 90 percent, or even at least 95 percent) reflective of at least some wavelengths of electromagnetic radiation in the range of 700 nm to 2500 nm;

"optically transparent" means transparent to at least some wavelengths over the electromagnetic radiation wavelength range of 390 nm to 700 nm;

"transparent" means having the property of transmitting rays of light through its substance so that bodies situated beyond or behind can be distinctly seen; and "urethane (meth)acrylate compound" means a compound having at least one (preferably at least 2, 3, 4, or more) carbamate group (i.e., —NHC(=O)O—) and at least one (meth)acryl group.

By definition, the total of weight percentages of ingredients in a composition cannot exceed 100 weight percent.

Features and advantages of the present disclosure will be further understood upon consideration of the detailed description as well as the appended claims.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Infrared-reflecting optically transparent assemblies according to the present disclosure can be made by providing a curable composition, coating the curable composition onto a major surface of an optically transparent thermoplastic polymer film, optionally at least partially drying the curable composition to provide an at least partially dried curable composition, at least partially curing the curable composition or the at least partially dried curable composition (if present) to provide a thermoformable composite film, and laminating the thermoformable composite film to an infrared-reflecting multilayer optical film to provide the infrared-reflecting optically transparent assembly.

Curable compositions useful in practice of the present disclosure comprise, based on the total weight of components a) to d):
 a) 70 to 95 weight percent of urethane (meth)acrylate compound (i.e., one or more urethane (meth)acrylate compounds) having an average (meth)acrylate functionality of 3 to 9, preferably 3 to 7, and more preferably 3 to 6;
 b) 2 to 20 weight percent (meth)acrylate monomer (i.e., one or more (meth)acrylates) having a (meth)acrylate functionality of 1 to 2, preferably 2;
 c) 0.5 to 2 weight percent of silicone (meth)acrylate (i.e., one or more silicone (meth)acrylates), preferably having 1 or 2 (meth)acrylate groups per silicone (meth)acrylate molecule;
 d) optional effective amount of photoinitiator (i.e., one or more photoinitiators), preferably 1 to 3 photoinitiators; and
 e) optional solvent (i.e., one or more solvents), preferably organic solvent.

The urethane (meth)acrylate compound contributes to the conformability and flexibility of the cured composition, and hence its suitability for thermoforming. Exemplary urethane (meth)acrylate compounds having an average (meth)acrylate functionality of 3 to 9 are available from commercial sources, and/or can be prepared according to known methods.

Commercially available urethane (meth)acrylate compounds include EBECRYL 264 aliphatic urethane triacrylate, EBECRYL 265 aliphatic urethane triacrylate, EBECRYL 1258 aliphatic urethane triacrylate, EBECRYL 4100 aliphatic urethane triacrylate, EBECRYL 4101 aliphatic urethane triacrylate, EBECRYL 8412 aliphatic urethane acrylate (trifunctional), EBECRYL 4654 aliphatic urethane triacrylate, EBECRYL 4666 aliphatic urethane triacrylate, EBECRYL 4738 aliphatic allophanate urethane triacrylate, EBECRYL 4740 aliphatic allophanate urethane triacrylate, EBECRYL 8405 aliphatic urethane tetraacrylate, EBECRYL 8604 aliphatic urethane tetraacrylate, EBECRYL 4500 aromatic urethane tetraacrylate, EBECRYL 4501 aromatic urethane tetraacrylate, EBECRYL 4200 aliphatic urethane tetraacrylate, EBECRYL 4201 aliphatic urethane tetraacrylate, EBECRYL 8702 aliphatic urethane hexaacrylate, EBECRYL 220 aromatic urethane hexaacrylate, EBECRYL 221 aromatic urethane hexaacrylate, EBECRYL 2221 aromatic urethane hexaacrylate, EBECRYL 2221 aromatic urethane hexaacrylate, EBECRYL 5129 aliphatic urethane hexaacrylate, EBECRYL 1290 aliphatic urethane hexaacrylate, EBECRYL 1291 aliphatic urethane hexaacrylate, EBECRYL 8301-R aliphatic urethane hexaacrylate, EBECRYL 8602 aliphatic urethane acrylate (nonfunctional), all from Allnex, Brussells, Belgium; and CN929 trifunctional urethane acrylate and CN9006 aliphatic urethane acrylate (hexafunctional) from Sartomer Co., Exton, Pa.

In some embodiments, the urethane (meth)acrylate compound can be synthesized by reacting a polyisocyanate compound with a hydroxyl-functional (meth)acrylate compound. A variety of polyisocyanates may be utilized in preparing the urethane (meth)acrylate compound. As used herein, the term "polyisocyanate" means any organic compound that has two or more reactive isocyanate (—NCO) groups in a single molecule such as, for example, diisocyanates, triisocyanates, tetraisocyanates, and mixtures thereof. For improved weathering and diminished yellowing the, urethane (meth)acrylate compound(s) employed herein are preferably aliphatic and therefore derived from an aliphatic polyisocyanate.

The urethane (meth)acrylate compound is preferably a reaction product of hexamethylene diisocyanate (HDI), such as available from Covestro LLC, Pittsburgh, Pa. as DESMODUR H, or a derivative thereof. These derivatives include, for example, polyisocyanates containing biuret groups, such as the biuret adduct of hexamethylene diisocyanate (HDI) available from Covestro LLC as DESMODUR N-100, polyisocyanates containing one or more isocyanurate rings such as that available from Covestro LLC as DESMODUR N-3300, as well as polyisocyanates containing urethane groups, uretdione groups, carbodiimide groups, and/or allophanate groups. Yet another useful derivative, is a hexamethylene diisocyanate (HDI) trimer, available from Covestro LLC as DESMODUR N-3800. These derivatives are preferred as they are polymeric, exhibit very low vapor pressures and are substantially free of isocyanate monomer.

In some embodiments, the urethane (meth)acrylate compound is the reaction product of a polyisocyanate such as a hexamethylene diisocyanate (HDI) derivative having an —NCO (i.e., isocyanate group) content of at least 10 percent, at least 15 percent, or even at least 20 weight percent. In some cases, HDI or other polyisocyanate may be reacted with hydroxyl-functional (meth)acrylate compounds and polyols. The —NCO content of the polyisocyanate is preferably not greater than 50 weight percent. On some embodiments, the polyisocyanate typically has an equivalent weight of at least 80, 100, 120, 140, 160, 180, or even 200 grams/per —NCO group. The equivalent weight is typically no greater than 500, 450, or 400 grams/per —NCO group and in some embodiments no greater than 350, 300, or 250 grams/per —NCO group, although this is not a requirement.

When aliphatic polyisocyanates comprising a cyclic group such as an isophorone diisocyanate (IPDI) derivative are used, the resulting cured composition can be less flexible (e.g., have poor thermoformability) and poor abrasion resistance.

The polyisocyanate is reacted with a hydroxyl-functional acrylate compound having the formula $HOQ(A)_p$; wherein Q is a divalent organic linking group, A is a (meth)acryl functional group —XC(=O)C($R_2$)=$CH_2$ wherein X is O, S, or NR wherein R is H or $C_1$-$C_4$ alkyl, $R_2$ is a lower alkyl of 1 to 4 carbon atoms or H; and p is 1 to 6. The —OH group reacts with the isocyanate group forming a urethane linkage.

In some embodiments, the polyisocyanate can be reacted with a diol acrylate, such as a compound of the formula $HOQ(A)Q_1Q(A)OH$, wherein $Q_1$ is a divalent linking group and A is a (meth)acryl functional group as previously described. Representative compounds include hydantoin hexaacrylate (HHA) (e.g., see Example 1 of U.S. Pat. No. 4,262,072 (Wendling et al.), and $H_2CH$=$C(CH_3)C$(=O)$OCH_2CH(OH)CH_2O(CH_2)_4OCH_2CH(OH)CH_2OC$(=O)C($CH_3$)=$CH_2$.

Q and $Q_1$ are independently a straight or branched chain or cycle-containing connecting group. Q can, for example, include a covalent bond, alkylene, arylene, aralkylene, or alkarylene. Q can optionally include heteroatoms such as O, N, and S, and combinations thereof. Q can also optionally include a heteroatom-containing functional group such as carbonyl or sulfonyl, and combinations thereof. In one embodiment, the hydroxyl-functional acrylate compounds used to prepare the urethane (meth)acrylate compound are monofunctional, such as in the case of hydroxyethyl acrylate, hydroxybutyl acrylate, and caprolactone monoacrylate, available as SR-495 from Sartomer Co. In this embodiment, p is 1.

In another embodiment, the hydroxyl-functional acrylate compounds used to prepare the urethane (meth)acrylate compound are multifunctional, such as the in the case of glycerol dimethacrylate, 1-(acryloxy)-3-(methacryloxy)-2-propanol, pentaerythritol triacrylate. In this embodiment, p is at least 2, at least 3, at least 4, at least 5, or at least 6.

In some embodiments, only monofunctional hydroxyl-functional acrylate compounds are utilized in the preparation of the urethane (meth)acrylate compound. In other embodiments, a combination of monofunctional and multifunctional hydroxyl-functional acrylate compounds are utilized in the preparation of the urethane (meth)acrylate compound. In some embodiments, the weight ratio of monofunctional hydroxyl-functional acrylate compound(s) to multifunctional hydroxyl-functional acrylate compound(s) ranges from 0.5:1 to 1:0.5. When the urethane (meth)acrylate compound is prepared from only multifunctional hydroxyl-functional acrylate compound(s), in some embodiments the resulting cured composition can be less flexible.

The average (meth)acrylate functionality is calculated in the following fashion. The functionality of the added acrylates for each compound is first calculated. For instance, the PE3 below is designated as 1.0 DESN100+0.25 HEA+0.75 PET3A. This means that the compound is the reaction product of 1 equivalent of isocyanate groups (as DESN100) and 0.25 hydroxyl equivalents of hydroxyethyl acrylate and 0.75 hydroxyl equivalents of PET3A. The HEA has 1 acrylate group per hydroxyl group and the PET3A has 3 acrylate groups per hydroxyl group. The functionality of added acrylates for this compound is then (0.25*1)+(0.75*3) or 2.5. The average (meth)acrylate functionality is found by multiplying the functionality of the added acrylates for each compound by the average functionality of the polyisocyanate. According to Covestro, the average functionality for DESN100 is 3.6, so the average (meth)acrylate functionality for the compound is at 2.5*3.6 or 9.

Other estimated average functionality of polyisocyanates for DESN3300, DESN3800, and DESZ4470BA are 3.5, 3.0, and 3.3 respectively.

In some embodiments, some of the isocyanate groups on the polyisocyanate can be reacted with a polyol such as, for example, an alkoxylated polyol available from Perstorp Holding AB, Sweden as Polyol 4800. Such polyols can have a hydroxyl number of 500 to 1000 mg KOH/g and a molecular weight ranging from at least 200 or 250 g/mole up to 500 g/mole.

In some embodiments, some of the isocyanate groups on the polyisocyanate can be reacted with a polyol such as 1,6-hexanediol.

Selection of reaction conditions used to react the polyisocyanate with (meth)acrylated alcohols, and choice of catalyst if any, will be apparent to those of skill in the art. Further examples can be found in the Examples section hereinbelow.

Useful (meth)acrylate monomers (which are preferably non-urethane, and preferably non-silicone, although this is not a requirement) have a (meth)acrylate functionality of 1 to 2. These monomers may function as diluents or solvents, as viscosity reducers, as binders when cured, and as cross-linking agents, for example. Examples of useful (meth) acrylates include mono(meth)acrylates such as octyl (meth) acrylate, nonylphenol ethoxylate (meth)acrylate, isononyl (meth)acrylate, isobornyl (meth)acrylate, 2-(2-ethoxyethoxy)ethyl (meth)acrylate, 2-ethylhexyl (meth)acrylate, lauryl (meth)acrylate, beta-carboxyethyl (meth)acrylate, isobutyl (meth)acrylate, 2-hydroxyethyl (meth)acrylate, isodecyl (meth)acrylate, dodecyl(meth)acrylate, n-butyl (meth)

acrylate, methyl (meth)acrylate, hexyl (meth)acrylate, (meth)acrylic acid, stearyl (meth)acrylate, hydroxy functional caprolactone ester (meth)acrylate, isooctyl (meth) acrylate, hydroxymethyl (meth)acrylate, hydroxypropyl (meth)acrylate, hydroxyisopropyl (meth)acrylate, hydroxybutyl(meth)acrylate, hydroxyisobutyl (meth)acrylate, tetrahydrofurfuryl (meth)acrylate, and alkoxylated versions of the above (meth(acrylate monomers, such as alkoxylated tetrahydrofurfuryl (meth)acrylate and combinations thereof. Tetrahydrofurfuryl (meth)acrylate is preferred in some embodiments; di(meth)acrylates such as 1,6-hexanediol di(meth)acrylate, poly(ethylene glycol) di(meth)acrylates, polybutadiene di(meth)acrylates, polyurethane di(meth) acrylates, ethylene glycol di(meth)acrylate, hexanediol di(meth)acrylate, diethylene glycol di(meth)acrylate, triethylene glycol di(meth)acrylate, tetraethylene glycol di(meth) acrylate, neopentyl glycol di(meth)acrylate, alkoxylated versions of the above di(meth)acrylates, and combinations thereof. Of these, 1,6-hexanediol diacrylate is preferred n some embodiments. (Meth)acrylate monomers having a functionality of 1 or 2 (e.g., as listed above) are widely commercially available.

Exemplary useful silicone (meth)acrylates include mono- and polyfunctional silicone (meth)acrylates. Of these, silicone poly(meth)acrylates may be preferred because the likelihood of unbound silicone (meth)acrylate after curing is generally reduced. Exemplary silicone (meth)acrylates include EBECRYL 350 silicone diacrylate and EBECRYL 1360 silicone hexaacrylate from Allnex, CN9800 aliphatic silicone acrylate and CN990 siliconized urethane acrylate compound from Sartomer Co., and TEGO RAD 2100, TEGO RAD 2250, and TEGO RAD 2500 silicone polyether acrylate from Evonik Industries, Parsippany, N.J.

The curable composition may optionally, but preferably, further comprise an effective amount of photoinitiator. By the term "effective amount" is meant an amount that is at least sufficient amount to cause curing of the curable composition under ambient conditions. It will be recognized that curing may be complete even though polymerizable (meth) acrylate groups remain.

Exemplary photoinitiators include α-cleavage photoinitiators such as benzoin and its derivatives such as α-methylbenzoin; α-phenylbenzoin; α-allylbenzoin; α-benzylbenzoin; benzoin ethers such as benzil dimethyl ketal (available as IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (available as DAROCUR 1173 from Ciba Specialty Chemicals) and 1-hydroxycyclohexyl phenyl ketone (available as IRGACURE 184 from Ciba Specialty Chemicals); 2-methyl-1-[4-(methylthio)phenyl]-2-(4-morpholinyl)-1-propanone (available as IRGACURE 907 from Ciba Specialty Chemicals); 2-benzyl-2-(dimethylamino)-1-[4-(4-morpholinyl)phenyl]-1-butanone (available as IRGACURE 369 from Ciba Specialty Chemicals); titanium complexes such as bis(η5-2,4-cyclopentadien-1-yl)bis[2,6-difluoro-3-(1H-pyrrol-1-yl)phenyl] titanium (available as CGI 784 DC from Ciba Specialty Chemicals); and mono- and bis-acylphosphines (available from Ciba Specialty Chemicals as IRGACURE 1700, IRGACURE 1800, IRGACURE 1850, and DAROCUR 4265). One useful photoinitiator, a difunctional alpha hydroxyketone, is available as ESACURE ONE from Lamberti S.p.A, Albizzate, Italy.

Desirably, if an acylphosphine or acylphosphine oxide photoinitiator is utilized, it is combined with a photoinitiator (e.g., 2-hydroxy-2-methyl-1-phenyl-1-propanone) having a high extinction coefficient at one or more wavelengths of the actinic radiation. Such combination typically facilitates surface cure while maintaining low levels of costly photoinitiator.

Other useful photoinitiators include: anthraquinones (e.g., anthraquinone, 2-ethylanthraquinone, 1-chloroanthraquinone, 1,4-dimethylanthraquinone, 1-methoxyanthraquinone) and benzophenone and its derivatives (e.g., phenoxybenzophenone, phenylbenzophenone).

The curable composition may contain optional solvent, generally organic solvent, although water/solvent blends may be used. Exemplary optional solvents include hydrocarbons or halogenated hydrocarbons (e.g., toluene, cyclohexane, petroleum ether, lower alcohols (e.g., methanol, ethanol, propanol, and isopropanol), esters of aliphatic acids (e.g., ethyl acetate), ethers (e.g., tetrahydrofuran), and ketones (e.g., acetone and methyl ethyl ketone). The solvents can be used singly or in admixture. One skilled in the art can readily determine which solvent to use, and its amount.

The curable composition may also contain one or more optional additives such as, for example, fillers, thickeners, tougheners, pigments, fibers, tackifiers, lubricants, wetting agents, surfactants, antifoaming agents, dyes, coupling agents, plasticizers, and suspending agents.

The optically transparent thermoplastic film comprises one or more thermoplastic polymers. The optically transparent thermoplastic film may be unitary or it may be a composite film comprising multiple layers which may be different. The optically transparent thermoplastic film may be in sheet forms, or continuous (e.g., a web), and may have any thickness suitable for thermoforming. In some embodiments, the optically transparent thermoplastic film has a thickness of from 25 microns to 3 mm, although this is not a requirement.

Useful thermoplastic polymers include, for example, polylactones (e.g., poly(pivalolactone) and poly(caprolactone)); polyurethanes (e.g., those derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4, 4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, or 4,4'-diisocyanatodiphenylmethane with linear long-chain diols such as poly(tetramethylene adipate), poly (ethylene adipate), poly(1,4-butylene adipate), poly(ethylene succinate), poly(2,3-butylenesuccinate), polyether diols); polycarbonates (e.g., poly(methane bis(4-phenyl) carbonate), poly(1,1-ether bis(4-phenyl)carbonate), poly(diphenylmethane bis(4-phenyl)carbonate), poly(1,1-cyclohexane bis(4-phenyl) carbonate), or poly(2,2-(bis4-hydroxyphenyl)propane) carbonate); polysulfones; polyether ether ketones; polyamides (e.g., poly(4-aminobutyric acid), poly(hexamethylene adipamide), poly(6-aminohexanoic acid), poly(m-xylylene adipamide), poly(p-xylylene sebacamide), poly(m-phenylene isophthalamide), and poly(p-phenylene terephthalamide)); polyesters (e.g., poly(ethylene azelate), poly(ethylene-1,5-naphthalate), poly(ethylene-2,6-naphthalate), poly(1,4-cyclohexane dimethylene terephthalate), poly(ethylene oxybenzoate), poly(para-hydroxy benzoate), poly(1,4-cyclohexylidene dimethylene terephthalate) (cis), poly(1,4-cyclohexylidene dimethylene terephthalate) (trans), polyethylene terephthalate, and polybutylene terephthalate); poly(arylene oxides) (e.g., poly(2,6-dimethyl-1,4-phenylene oxide) and poly(2,6-diphenyl-1,1-phenylene oxide)); polyetherimides; vinyl polymers and their copolymers (e.g., polyvinyl acetate, polyvinyl alcohol, polyvinyl chloride, polyvinyl butyral, polyvinylidene chloride, and ethylene-vinyl acetate copolymers); acrylic polymers (e.g., poly(ethyl acrylate), poly(n-butyl acrylate), poly(methyl methacrylate), poly(ethyl methacrylate), poly(n-butyl methacrylate), poly(n-propyl methacrylate), polyacrylamide, polyacrylonitrile, ethylene-ethyl acrylate copolymers, and ethylene-acrylic acid copolymers, poly(acrylonitrile-co-butadiene-co-styrene) and poly(styrene-co-acrylonitrile)); styrenic polymers (e.g., polystyrene, poly(styrene-co-maleic anhydride) polymers and their derivatives, methyl methacrylate-styrene copolymers, and methacrylated butadiene-styrene copolymers); polyolefins (e.g., polyethylene, polybutylene, polypropylene, chlorinated low density polyethylene, poly(4-methyl-1-pentene)); cellulose ester plastics (e.g., cellulose acetate, cellulose acetate butyrate, and cellulose propionate); polyarylene ethers (e.g., polyphenylene oxide); polyimides; polyvinylidene halides; aromatic polyketones; and polyacetals. Copolymers and/or combinations of these aforementioned polymers can also be used. Of these polycarbonates are typically preferred.

The curable composition may be coated onto a major surface of the optically transparent thermoplastic polymer film by any suitable technique including, for example, spray coating, roll coating, gravure coating, slot coating, knife coating, bar coating, and dip coating. If optional solvent is present, it is typically at least substantially removed at this point (e.g., using a forced air oven or other heating means).

Next, the optionally at least partially dried, curable composition is at least partially cured, preferably fully cured to provide the thermoformable composite film. Curing may be accomplished using heat if the curable composition comprises a thermal initiator (e.g., a peroxide initiator), particulate radiation (e.g. e-beam), or photocuring (e.g., using ultraviolet and/or visible wavelengths of electromagnetic radiation). Techniques for such curing technologies are well-known in the art and are within the capability of the skilled artisan.

The thermoformable composite film is laminated to an infrared-reflecting multilayer optical film to provide the infrared-reflecting optically transparent assembly.

Infrared-reflecting multilayer optical films are well known and can be made according to known methods or obtained from commercial suppliers such as, for example, 3M Company, St. Paul, Minn.

Multilayer optical films (including infrared-reflecting MOFs) can be made by coextrusion of alternating polymer layers having different refractive indices, for example, as described in U.S. Pat. No. 5,882,774 (Jonza et al.); U.S. Pat. No. 6,045,894 (Jonza et al.); U.S. Pat. No. 6,667,095 (Wheatley et al.); U.S. Pat. No. 6,783,349 (Neavin et al.) U.S. Pat. No. 7,271,951 B2 (Weber et al); U.S. Pat. No. 7,632,568 (Padiyath et al.); and U.S. Pat. No. 7,652,736 (Padiyath et al.); U.S. Pat. No. 7,952,805 (McGurran et al.). In some embodiments, the infrared-reflecting MOF is at least 30, 40, 50, 60, 70, 80, or even at least 90 percent reflective to infrared wavelengths in the range 700 nm to 1000 nm, preferably 700 nm to 1500 nm, and more preferably 700 nm to 2500 nm, although this is not a requirement.

Lamination can be accomplished by heating and/or pressure, more preferably using an adhesive (e.g., a pressure-sensitive adhesive). Exemplary pressure-sensitive adhesives include latex crepe, rosin, acrylic polymers, and copolymers including polyacrylate esters (e.g., poly(butyl acrylate)), vinyl ethers (e.g., poly(vinyl n-butyl ether)), alkyd adhesives, rubber adhesives (e.g., natural rubber, synthetic rubber, chlorinated rubber), and mixtures thereof.

Figure 1:
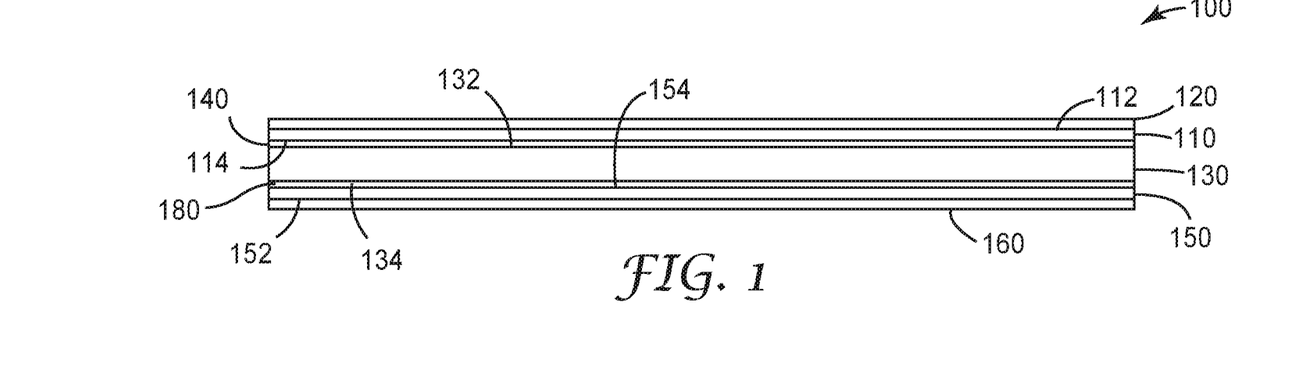
FIG. 1 is an enlarged schematic side view of exemplary infrared-reflecting optically transparent assembly 100.

Referring now to FIG. 1, exemplary infrared-reflecting optically transparent assembly 100 comprises first optically transparent thermoplastic polymer film 110 having first and second opposed major surfaces (112, 114). First protective coating 120 is disposed on first major surface 112. First protective coating 120 comprises an at least partially cured first composition comprising, based on the total weight of components a) to d): a) 70 to 90 weight percent of urethane (meth)acrylate compound having an average (meth)acrylate functionality of 3 to 9; b) 5 to 20 weight percent (meth) acrylate monomer having a (meth)acrylate functionality of 1 to 2; c) 0.5 to 2 weight percent of silicone (meth)acrylate; and d) optional effective amount of photoinitiator. First major surface 132 of infrared-reflecting multilayer optical film 130 is securely bonded to second major surface 114 of first optically transparent thermoplastic polymer film 110 by optional first adhesive layer 140.

In the embodiment shown, second optically transparent thermoplastic polymer film 150 has first and second opposed major surfaces (152, 154). Second protective coating 160 is disposed on first major surface 152 of second optically transparent thermoplastic polymer film 150. Second protective coating 160 comprises an at least partially cured second composition comprising, based on the total weight of components a) to d): a) 70 to 90 weight percent of urethane (meth)acrylate compound having an average (meth)acrylate functionality of 3 to 9; b) 5 to 20 weight percent (meth) acrylate monomer having a (meth)acrylate functionality of 1 to 2; c) 0.5 to 2 weight percent of silicone (meth)acrylate; and d) optional effective amount of photoinitiator. Second major surface 154 of second optically transparent thermoplastic polymer film 150 is securely bonded to second major surface 134 of infrared-reflecting multilayer optical film 130 opposite first optically transparent thermoplastic polymer film 110.

Figure 2:
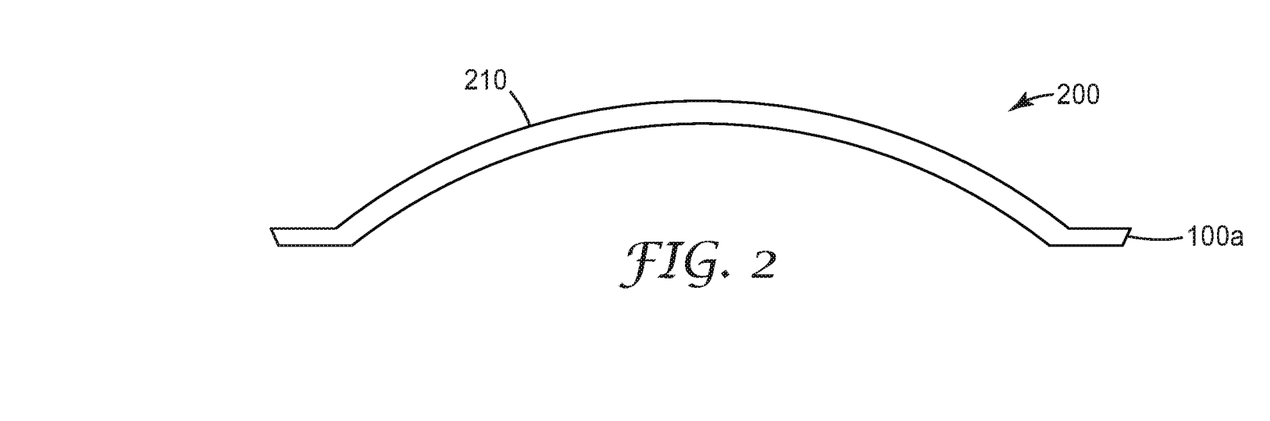
FIG. 2 is a schematic cross-sectional side view of exemplary shaped infrared-reflecting optically transparent assembly 200.

Infrared-reflecting optically transparent assembly can be thermoformed into a shape suitable for a desired application such as, for example, as a protective barrier for a lens. Referring now to FIG. 2, shaped infrared-reflecting optically transparent assembly 200 comprises shaped infrared-reflecting optically transparent assembly 100a, which is equivalent to 100, but thermoformed into the contour 210 corresponding to a desired a lens surface (not shown).

Thermoforming is a manufacturing process whereby the plastic film is heated to a pliable forming temperature, formed to a specific shape in a mold, and trimmed to create a usable product. The film is typically heated in an oven to a high-enough temperature that permits it to be stretched into or onto a mold and cooled to a finished shape. Its simplified version is vacuum forming. Suitable thermoforming techniques are well known to those of skill in the art. Hardcoats on thermoplastic films may be assessed for their thermoformability by thermoforming them into an 8 base lens shape and determining the amount of cracking of the hardcoat from the edges of the lens shape to the center of the lens shape. Preferred embodiments exhibit no cracking anywhere on the lens shape. If the coating on the lens shape cracks, the crack usually starts on the edge. For example, if a crack starts at the edge and continues 20% of the distance between the edge and the center of the lens shape, then cracking is reported as 20% from the edge. Once a lens shape is thermoformed, generally there is no further cracking when this lens shape is used in further molding operations.

Shaped infrared-reflecting optically transparent assembly 200 can be attached to a lens by any suitable method such as, for example, heat lamination, backfill injection molding, or adhesive. Typically, some trimming of excess shaped infrared-reflecting optically transparent assembly 200 may be desired. Accordingly, in one method, the infrared-reflecting optically transparent assembly is placed in an injection mold cavity (e.g., a lens-shaped cavity), and molten thermoplastic polymer is injected into the injection mold cavity. Upon cooling the infrared-reflecting lens assembly is removed from the injection mold cavity.

Figure 3A:
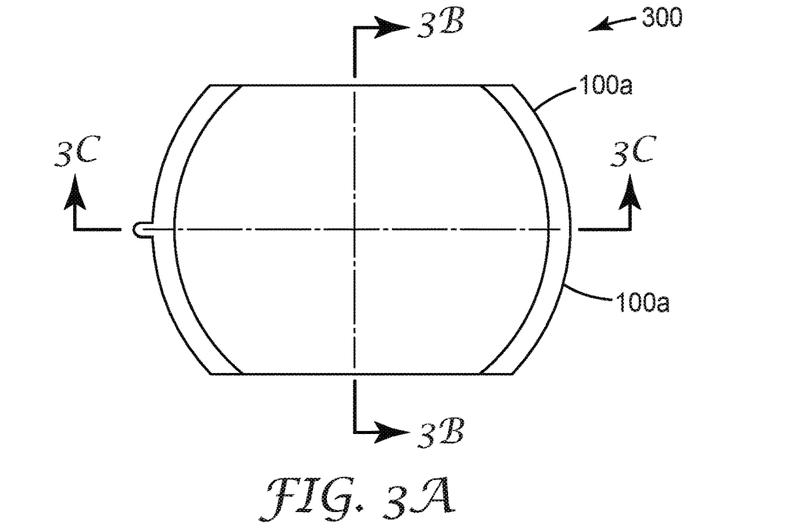
FIG. 3A is a schematic top view of an exemplary infrared-reflecting lens assembly 300.
Figure 3B:
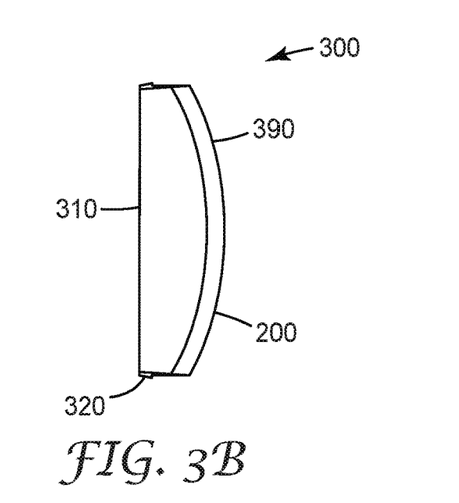
FIG. 3B is a schematic side view of exemplary infrared-reflecting lens assembly 300 taken parallel to line 3B-3B.
Figure 3C:
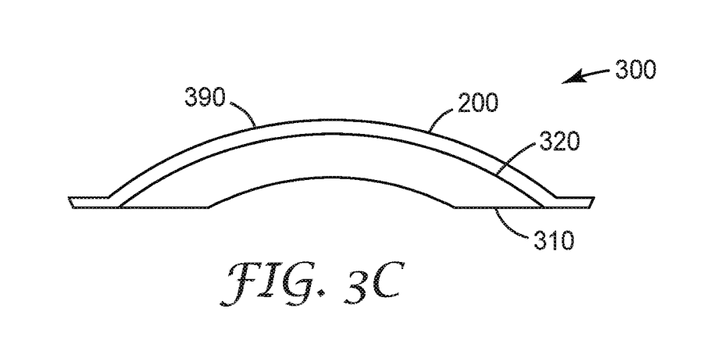
FIG. 3C is a schematic cross-sectional side view of infrared-reflecting lens assembly 300 taken along line 3C-3C.

Referring now to FIGS. 3A-3C, shaped infrared-reflecting optically transparent assembly 200 is bonded to lens 310 by optional adhesive layer 320 to form infrared-reflecting lens assembly 300. Outer surface 390 is shaped corresponding to a thermoforming mold cavity. Infrared-reflecting optically transparent assembly is coextensive with the lens surface 330.

The infrared-reflecting lens assembly, shaped infrared-reflecting optically transparent assembly, and/or infrared-reflecting optically transparent assembly may be incorporated into protective eyewear such as, for example, safety glasses, goggles, visors, and/or face shields.

Select Embodiments of the Present Disclosure

In a first embodiment, the present disclosure provides a method of making an infrared-reflecting optically transparent assembly, the method comprising steps:

i) providing a curable composition comprising components:
 a) 70 to 95 weight percent of urethane (meth)acrylate compound having an average (meth)acrylate functionality of 3 to 9, based on the total weight of components a) to d);
 b) 2 to 20 weight percent (meth)acrylate monomer having a (meth)acrylate functionality of 1 to 2, based on the total weight of components a) to d), wherein the (meth)acrylate monomer is not a urethane (meth)acrylate compound;
 c) 0.5 to 2 weight percent of silicone (meth)acrylate, based on the total weight of components a) to d);
 d) optional effective amount of photoinitiator; and
 e) optional solvent;

ii) coating the curable composition onto a major surface of an optically transparent thermoplastic polymer film;

iii) optionally at least partially drying the curable composition to provide an at least partially dried curable composition;

iv) at least partially curing the curable composition or the at least partially dried curable composition to provide a thermoformable composite film; and v) laminating the thermoformable composite film to an infrared-reflecting multilayer optical film to provide the infrared-reflecting optically transparent assembly.

In a second embodiment, the present disclosure provides a method according to the first embodiment, wherein the urethane (meth)acrylate compound has an average (meth)acrylate functionality of 4 to 7.

In a third embodiment, the present disclosure provides a method according to the first or second embodiment, wherein the thermoplastic polymer film comprises a polycarbonate.

In a fourth embodiment, the present disclosure provides a method according to any one of the first to third embodiments, wherein component d) is present in the curable composition.

In a fifth embodiment, the present disclosure provides a method according to any one of the first to fourth embodiments, wherein component e) is present in the curable composition.

In a sixth embodiment, the present disclosure provides a method according to any one of the first to fifth embodiments, wherein component b) comprises at least one of 1,6-hexanediol di(meth)acrylate or an alkoxylated tetrahydrofurfuryl (meth)acrylate.

In a seventh embodiment, the present disclosure provides a method according to any one of the first to sixth embodiments, wherein in component a) the urethane (meth)acrylate compound includes at least one of an isocyanurate ring or a biuret group.

In an eighth embodiment, the present disclosure provides a method according to any one of the first to seventh embodiments, further comprising:
 vi) shaping the infrared-reflecting optically transparent assembly.

In a ninth embodiment, the present disclosure provides a method according to the eighth embodiment, wherein said shaping comprises thermoforming.

In a tenth embodiment, the present disclosure provides an infrared-reflecting optically transparent assembly comprising:

a first optically transparent thermoplastic polymer film having first and second opposed major surfaces;

a first protective coating disposed on a least a portion of the first major surface of the first optically transparent thermoplastic polymer film, wherein the first protective coating comprises an at least partially cured first composition comprising:
 a) 70 to 95 weight percent of urethane (meth)acrylate compound having an average (meth)acrylate functionality of 3 to 9, based on the total weight of components a) to d);
 b) 2 to 20 weight percent (meth)acrylate monomer having a (meth)acrylate functionality of 1 to 2, based on the total weight of components a) to d), wherein the (meth)acrylate monomer is not a urethane (meth)acrylate compound;
 c) 0.5 to 2 weight percent of silicone (meth)acrylate, based on the total weight of components a) to d); and
 d) optional effective amount of photoinitiator; and a first major surface of an infrared-reflecting multilayer optical film securely bonded to at least a portion of the second major surface of the first optically transparent thermoplastic polymer film.

In an eleventh embodiment, the present disclosure provides an infrared-reflecting optically transparent assembly method according to the tenth embodiment, wherein the urethane (meth)acrylate compound has an average (meth)acrylate functionality of 4 to 7.

In a twelfth embodiment, the present disclosure provides an infrared-reflecting optically transparent assembly method according to the tenth or ninth embodiment, wherein the thermoplastic polymer film comprises a polycarbonate.

In a thirteenth embodiment, the present disclosure provides an infrared-reflecting optically transparent assembly method according to any one of the tenth to twelfth embodiments, wherein component d) is present in the curable composition.

In a fourteenth embodiment, the present disclosure provides an infrared-reflecting optically transparent assembly method according to any one of the tenth to thirteenth embodiments, wherein component b) comprises at least one of 1,6-hexanediol di(meth)acrylate or an alkoxylated tetrahydrofurfuryl.(meth)acrylate.

In fifteenth embodiment, the present disclosure provides an infrared-reflecting optically transparent assembly method according to any one of the tenth to fourteenth embodiments, wherein in component a) the urethane (meth)acrylate compound includes at least one of an isocyanurate ring or a biuret group.

In a sixteenth embodiment, the present disclosure provides an infrared-reflecting optically transparent assembly method according to any one of the tenth to fifteenth embodiments optically transparent thermoplastic polymer film securely bonded to a second major surface of the infrared-reflecting multilayer optical film opposite the first optically transparent thermoplastic polymer film.

In a seventeenth embodiment, the present disclosure provides an infrared-reflecting optically transparent assembly method according to any one of the tenth to sixteenth embodiments, wherein the infrared-reflecting optically transparent assembly is shaped into the contour of a lens surface.

In an eighteenth embodiment, the present disclosure provides an infrared-reflecting optically transparent assembly method according to the seventeenth embodiment, wherein the infrared-reflecting optically transparent assembly is coextensive with the lens surface.

In a nineteenth embodiment, the present disclosure provides method of making an infrared-reflecting lens assembly, the method comprising steps:

placing an infrared-reflecting optically transparent assembly according to the seventeenth or eighteenth embodiment into a lens-shaped injection mold cavity;

injecting molten thermoplastic polymer into the injection mold cavity; and removing the infrared-reflecting lens assembly from the injection mold cavity.

In a twentieth embodiment, the present disclosure provides an infrared-reflecting lens assembly comprising:

the infrared-reflecting optically transparent assembly according to the seventeenth or eighteenth embodiment secured to a thermoplastic polymer lens.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the examples and the rest of the specification are by weight. All reagents used in the examples were obtained, or are available, from general chemical suppliers such as, for example, Sigma-Aldrich Company, Saint Louis, Mo., or may be synthesized by conventional methods.

These abbreviations are used in the following examples: g=grams, min=minutes, hr=hour, □C=degrees Celsius, and eq.=equivalents.

Materials Used in the Examples

| DESIGNATION | DESCRIPTION |
| --- | --- |
| AcMac | 1-acryoyloxy-3-methacryloyloxy-2-propanol, CAS number 1709-71-3, TCI America, Portland, Oregon |
| BHT | 2,6-di-t-butyl-4-methylphenol, obtained from Alfa Aesar, Ward Hill, Massachusetts |
| DBTDL | dibutyltin diacrylate, obtained from Sigma-Aldrich Chemical Co. |
| DESN100 | DESMODUR N100 biuret-based hexamethylene diisocyanate oligomer, 100% solids, 22.0 wt. % NCO, 191 g/eq., obtained from Covestro LLC |
| DESN3300A | DESMODUR N3300A isocyanurate-based hexamethylene diisocyanate oligomer, 100% solids, 21.8 wt. % NCO, 193 g/eq., obtained from Covestro LLC |
| DESZ4470BA | DESMODUR Z4470BA isophorone diisocyanate-based isocyanurate at about 70 wt. % solids in butyl acetate, 11.9 wt. % NCO, 353 g/eq., obtained from Covestro LLC |
| EtOH | ethanol |
| GDMA | glycerol dimethacrylate, obtained as VISIOMER GDMA from Evonik Industries AG, Darmstadt, Germany |
| H12MDI | DESMODUR W 4,4'-methylenebis(cyclohexyl isocyanate), 100% solids, 31.8 wt. % NCO, 132 g/eq., obtained from Covestro LLC |
| HDDA | 1,6-hexanediol diacrylate, obtained from Sartomer Co. |
| HDOL | 1,6-hexanediol |
| HEA | 2-hydroxyethyl acrylate, obtained from Alfa Aesar |
| 4-hydroxy TEMPO | 4-hydroxy-2,2,6,6-tetramethylpiperidine 1-oxyl, obtained from Sigma-Aldrich Chemical Co. |
| IPDI | DESMODUR I isophorone diisocyanate, 100% solids, 37.5 wt. % NCO, 111 g/eq., obtained from Covestro LLC, Pittsburgh, Pennsylvania |
| IRMOF | an infrared-reflective multilayer optical film, greater than 99% reflection from 800-1300 nm, made from two packets of 275 alternating microlayers layers of poly(ethylene naphthalate) (PEN) and poly(methyl methacrylate) (PMMA) having a layer thickness gradient, with each packet having a boundary layer of PEN. The outer layer of the combined two packet construction had skin layers of XYLEX RESIN polycarbonate polyester/blend from Sabic IP, Dusseldorf, Germany. The film was prepared generally according to the method described in U.S. Pat. No. 7,271,951 B2 (Weber et al.). |
| MEK | methyl ethyl ketone |
| MP | 1-methoxy-2-propanol |
| OCA | 3M OPTICALLY CLEAR ADHESIVE 8171, acrylic pressure-sensitive laminating adhesive, available from 3M Company, St Paul, Minnesota, 25 microns thickness |
| PC film | Bisphenol A-based polycarbonate film, 5 mil (0.13 mm) thick, available as LEXAN 8010-112MC film from Sabic IP |
| PETA | pentaerythritol triacrylate, obtained from Sartomer Co. as SR444C |
| PI | photoinitiator, obtained from Lamberti USA, Conshohocken, Pennsylvania as ESACURE ONE |
| SR611 | alkoxylated tetrahydrofurfuryl acrylate monomer from Sartomer Co. |
| TEG2250 | TEGORAD 2250 acrylated silicone surfactant, obtained from Evonik Industries, Parsippany, New Jersey |
| TEG2100 | TEGORAD 2100 acrylated silicone surfactant, obtained from Evonik Industries |
| UVHC3000 | SILFORT UVHC3000 hardcoat, a clear, solvent-based hardcoat curable by UV radiation, from Momentive Performance Materials Inc., Albany, New York |
| UVHC5000 | SILFORT UVHC5000 hardcoat, a clear, solvent based hardcoat curable by UV radiation, from Momentive Performance Materials Inc. |
| EBECRYL 225 | Ten functional aliphatic urethane acrylate oligomer from Allnex, Alpharetta, Georgia |
| EBECRYL 1290 | Hexafunctional aliphatic urethane acrylate oligomer from Allnex |
| EBECRYL 8301R | Hexafunctional aliphatic urethane acrylate oligomer from Allnex |
| EBECRYL 8602 | Nine functional aliphatic urethane acrylate oligomer from Allnex |

| DESIGNATION | DESCRIPTION |
|---|---|
| EBECRYL 8604 | Aliphatic urethane tetra-acrylate oligomer from Allnex |
| GENOMER 4690 | Aliphatic urethane hexa-acrylate oligomer from Rahn, Aurora, Illinois |
| CN968 | Aliphatic urethane hexa-acrylate oligomer from Sartomer, Exton, Pennsylvania |
| CN9006 | Hexafunctional aliphatic urethane acrylate oligomer from Sartomer |
| CN9010 | Hexafunctional aliphatic urethane acrylate oligomer from Sartomer |
| CN9013 | Nine functional aliphatic urethane acrylate oligomer from Sartomer |
| CN9025 | Hexafunctional aliphatic urethane acrylate oligomer from Sartomer |
| CN9039 | Hexafunctional aliphatic urethane acrylate oligomer from Sartomer |

Test Methods

Abrasion Test

Abrasion of film samples was tested downweb to the coating direction using a Taber model 5750 Linear Abraser (Taber Industries, North Tonawanda, N.Y.). The collet oscillated at 40 cycles/minute. The abrasive material used for this test was an eraser insert (obtained from Summers Optical, a division of EMS Acquisition Corp., Hatfield, Pa.). The eraser insert had a diameter of 6.5 mm and met the requirements of military standard Mil-E-12397B.

The eraser insert was held in place through duration of test by the collet. A single sample was tested for each example with a total weight of 1.1 kg weight and 20 cycles. After abrasion, the sample was cleaned of residue by wiping with a lens cleaning towelette (Radnor Products, Radnor, Pa.). Next, the optical haze and transmission of each sample was measured using a Haze-Gard Plus haze meter (BYK Gardner, Columbia, Md.) at three different points. The delta haze value for each sample was calculated by subtracting the haze of an untested region of the sample. The loss of transmission for each sample was calculated by subtracting the transmission after testing from the transmission of an untested region of the sample.

For testing of lens samples, this procedure was modified in the following fashion.

The linear abraser had a horizontal arm that reciprocated in a linear motion. Attached to the end of the arm was a bearing spline shaft that created a free-floating system permitting vertical movement so that during the horizontal back and forth strokes the tool could raise or lower to follow the lens contour. For the abrasion exposure, lens samples were mounted in a horizontal clamp so that the abraser tool could be moved across the lens sample with a total travel distance of 25 mm at a speed corresponding to a rate of 40 abrasion cycles per minute. The effect of the abrasion cycles on the lens samples was determined by the measurement of percent haze of each sample, before and after the linear abrasion. Percent haze was measured using a BYK Haze-Gard Plus meter. Haze measurements were made through a flexible 7 mm×18 mm rectangular aperture held manually against the surface of each lens to restrict the measurement to the area of each lens given the abrasion exposure.

UV/Visible/Near-IR Transmission Spectra

UV/Visible/Near-IR percent transmission spectra were measured using a Perkin-Elmer Lambda 1050 spectrophotometer. Each lens sample was placed at the entrance to a 150 mm integrating sphere and its transmission spectrum recorded at 1 nanometer intervals. The ratio of these spectra to the transmission spectrum of the spectrophotometer and integrating sphere with no lens present was used to determine the percent transmission spectrum of each lens sample. The percent transmission spectrum of each sample contained a region at visible wavelengths, between 380 nm and 780 nm, with high light transmittance (>80%) and a region at near-infrared wavelengths, between 800 nm and 1300 nm, with low light transmittance (<1%).

The boundary of the spectral region where each sample exhibited low light transmittance can be characterized by a wavelength at the short wavelength side of the region at which the light transmittance has decreased to half of its value as light wavelength increases called the left band edge and a wavelength at the long wavelength side of the region at which the light transmittance has increased to half its ultimate value as light wavelength increases called the right band edge.

These values for each of patent examples 1, 2, 3, and 4 are shown in Table 8. The table also shows the integrated light transmittance of each sample in the visible spectral region (luminous transmittance, $T_L$) and the near-IR spectral region (near-IR average transmittance, $T_{IR}$). $T_L$ is calculated by taking the ratio of the integral of the product of spectral transmittance, the relative luminous efficiency function, and the relative spectral emittance to the integral of the product of the relative luminous efficiency function and the relative spectral emittance. This integral is evaluated over the spectral region 380 nm to 780 nm. The relative luminous efficiency function and the relative spectral emittance values can be found in Table C2 of Annex C in the ANSI/ISEA Z87.1-2010 standard. $T_{IR}$ is calculated by taking the ratio of the integral of the product of spectral transmittance and the relative spectral emittance of a blackbody radiator at a temperature of 2856K to the integral of the relative spectral emittance of the blackbody radiator. For the purposes of the table below this integral is evaluated over the spectral region 800 nm to 1300 nm. The relative spectral emittance of the blackbody radiator at a temperature of 2856K can be found in Table C3 of Annex C in the ANSI/ISEA Z87.1-2010 standard. As shown in the table, all samples transmitted at least 80% of the visible light while only 0.02% of the near-IR light was transmitted.

Crosshatch Adhesion Test

Crosshatch adhesion of each sample was measured using the ASTM D3359-09, "Standard Test Methods for Measuring Adhesion by Tape Test", Test Method B using 3M 893 filament tape (3M Company, St. Paul, Minn.).

Preparative Example 1 (PEI)

A 250-mL jar equipped with a magnetic stir bar was charged with 39.76 g (0.2082 eq.) of DESN100, 25 g of MEK, 12.33 g (0.1062 eq.) of HEA, 47.91 g (0.1062 eq.) of PETA, for a total of 1.01 eq. OH per eq. of NCO, 0.025 g (250 ppm) BHT, 0.005 g (50 ppm) of 4-hydroxy TEMPO, and 0.05 g (500 ppm) of DBTDL. The jar was placed in a water bath at room temperature and allowed to stir for 10 min. After 10 min., it was placed into a 55° C. bath for 4 hr. At the end of that time, the reaction mixture was monitored by FTIR and found to have no NCO peak at 2265 cm$^{-1}$. The resulting material was 80 wt. % solids.

Preparative Examples PE2-PE14 (PE2-PE14)

PE2-PE14 were prepared in the same manner as PE1 described above by reacting the preparations reported in Table 1. The reactions were carried out using an appropriately sized jar. The amount of materials used in preparations described in Table 1 were reported in grams (g) and unless noted otherwise, further included 250 ppm BHT, 50 ppm TEMPO, and 500 ppm DBTDL with respect to solids. The resulting products were 80 wt. % solids in MEK, except for products made with DESZ4470BA (i.e., PE9) which was 75 wt. % in butyl acetate and MEK.

Preparative Examples PE15-PE17

PE15-PE17 were prepared in the same manner as PE1 described above by reacting the preparations reported in Table 2. The reactions were carried out using an appropriately sized jar. The amount of materials used in preparations described in Table 1 were reported in grams (g) and unless noted otherwise, further included 250 ppm BHT, 50 ppm TEMPO, and 500 ppm DBTDL with respect to solids. All materials, except the HDOL, were reacted for about 4 hr, then the HDOL was added and reacted with the mixture for an additional 4 hr.

TABLE 1

| PREPARATIVE EXAMPLE | DESCRIPTION | ISOCYANATE, g | HEA, g | AcMac, g | GDMA, g | PETA, g | MEK, g | AVERAGE (METH)ACRYLATE FUNCTIONALITY OF URETHANE (METH)ACRYLATE COMPOUND |
|---|---|---|---|---|---|---|---|---|
| PE1 | 1.0 DESN100 + 0.5 HEA + 0.5 PETA | DESN100, 39.76 | 12.33 | | | 47.91 | 25 | 7.2 |
| PE2 | 1.0 DESN100 + PETA | DESN100, 29.32 | | | | 70.68 | 25 | 10.8 |
| PE3 | 1.0 DESN100 + 0.25 HEA + 0.75 PETA | DESN100, 33.75 | 5.23 | | | 61.01 | 25 | 9 |
| PE4 | 1.0 DESN100 + 0.75 HEA + 0.25 PETA | DESN100, 48.37 | 22.5 | | | 29.14 | 25 | 5.4 |
| PE5 | 1.0 DESN100 + 1.0 AcMac | DESN100, 46.64 | | 53.36 | | | 25 | 7.2 |
| PE6 | 1.0 DESN3300 + 1.0 GDMA | DESN100, 45.07 | | | 54.93 | | 25 | 7 |
| PE7 | 1.0 DESN3300 + 1.0 PETA | DESN3300, 29.5 | | | | 70.50 | 25 | 10.5 |
| PE8 | 1.0 DESN3300 + 0.5 HEA + 0.5 PETA | DESN3300, 95.99 | 29.47 | | | 114.54 | 60 | 7 |
| PE9 | 1.0 DESZ4470BA + 0.5 HEA + 0.5 PETA | DESZ4470BA, 78.45 | 13.05 | | | 50.73 | 16.35 | 6.6 |
| PE10 | 1.0 DESN3800 + 0.5 HEA + 0.5 PETA | DESN3800, 78.45 | 12.50 | | | 48.58 | 34.88 | 6 |
| PE11 | 1.0 DESN100 + 1.0 HEA | DESN100, 61.96 | 38.04 | | | | 25 | 3.6 |
| PE12 | 1.0 DESN3300 + 1.0 HEA | DESN3300, 62.16 | 37.84 | | | | 25 | 3.5 |
| PE13 | 1.0 DESN3300 + 0.833 HEA + 0.166 PETA | DESN3300, 52.34 | 26.82 | | | 20.84 | 25 | 4.7 |
| PE14 | 1.0 Des N3300 + 0.67 HEA + 0.33 PETA | DESN3300, 45.32 | 18.58 | | | 36.1 | 25 | 5.8 |

TABLE 2

| PREPARATIVE EXAMPLE | DESCRIPTION | DESN3300, g | HEA, g | PETA, g | HDOL, g | MEK, g | AVERAGE (METH)ACRYLATE FUNCTIONALITY OF URETHANE (METH)ACRYLATE COMPOUND |
|---|---|---|---|---|---|---|---|
| PE15 | 1.0 DESN3300 + 0.33 HEA + 0.33 PETA + 0.33 HDOL | 47.49 | 9.73 | 37.82 | 4.95 | 25 | 4.6 |
| PE16 | 1.0 DESN3300 + 0.166 HEA + 0.50 PETA + 0.33 HDOL | 41.64 | 4.27 | 49.75 | 4.34 | 25 | 5.8 |

TABLE 2-continued

| PREPARATIVE EXAMPLE | DESCRIPTION | DESN3300, g | HEA, g | PETA, g | HDOL, g | MEK, g | AVERAGE (METH)ACRYLATE FUNCTIONALITY OF URETHANE (METH)ACRYLATE COMPOUND |
|---|---|---|---|---|---|---|---|
| PE17 | 1.0 DESN3300 + 0.67 PETA + 0.33 HDOL | 37.08 | | 59.06 | 3.87 | 25 | 7.0 |

Preparative Examples 18-34

Coating solutions were prepared by mixing components as reported in Table 3. A desired amount of the coating solution was added to a desired amount of a pre-mixture containing 32 g of HDDA, 6.4 g of PI, and 592.4 g of solvent. Each mixture was allowed to gently mix on a jar roller. Once the mixture had returned to room temperature, the desired amount of TEG2250 was added to the mixture. Again the mixture was allowed to gently mix on the jar roller. If required, heat was applied to produce a clear, compatible coating solution. The amounts of various components added to prepare the coating solutions were in wt. % solids.

Then, to prepare each preparative example, the indicated coating solution composition in Tables 3 and 4 was coated at 32 wt. % solids onto PC film. In Table 3, the identity of the Preparative Example Oligomer is reported in Table 4 for each Preparative Example. The coating was done using a No. 6 wire wound rod (available from RD Specialties, Webster, N.Y., nominal wet film thickness 0.16 mils (3.9 microns) and dried at 80° C. for 2 min. The dried coating was then cured using a UV processor equipped with an H-type bulb (available from Heraeus Noblelight America (Fusion UV Systems), Gaithersburg, Md.) at 100% power under nitrogen at 30 feet/minute (12.1 m/min). The cured coating had a thickness of about 1.25 microns.

Preparative Examples 35-55C

Coating solutions were prepared by mixing components as reported in Table 3. A desired amount of urethane acrylate oligomer was added to a desired amount of a pre-mixture containing: HDDA, SR611, TEG2100, PI and MP. The amounts of various components added to prepare the coating solutions were in wt. % solids.

Then, to prepare each preparative example, the indicated coating solution composition in Tables 3 and 4 was coated at 32 wt. % solids onto PC film. In Table 3, the identity of the Preparative Example Oligomer is reported in Table 4 for each Preparative Example. The coating was done using a No. 7 wire wound rod (available from RD Specialties, Webster, N.Y., nominal wet film thickness 0.43 mils (10.6 microns) and dried at 80° C. for 1.5 min. The dried coating was then cured using a UV processor equipped with an H-type bulb (available from Heraeus Noblelight America (Fusion UV Systems), Gaithersburg, Md.) at 100% power under nitrogen at 30 feet/minute (12.1 m/min). The cured coating had an estimated thickness of about 3.4 microns.

TABLE 3

| | CHARGE, g | SOLIDS, g | SOLVENT | WT. % SOLIDS | WT. % OF COATING SOLUTION |
|---|---|---|---|---|---|
| PREPARATIVE EXAMPLES 18-31 | | | | | |
| PREPARATIVE EXAMPLE OLIGOMER | 17.4 | 13.92 | 3.48 | 87.00 | 34.80 |
| HDDA | 1.6 | 1.6 | | 10.00 | 3.20 |
| TEG2250 | 0.16 | 0.16 | | 1.00 | 0.32 |
| PI | 0.32 | 0.32 | | 2.00 | 0.64 |
| EtOH | 27.12 | | 27.12 | 0.00 | 54.24 |
| MP | 3.4 | | 3.4 | 0.00 | 6.80 |
| PREPARATIVE EXAMPLES 32-34 | | | | | |
| PREPARATIVE EXAMPLE OLIGOMER | 17.4 | 13.92 | 3.48 | 87.00 | 34.80 |
| HDDA | 1.6 | 1.6 | | 10.00 | 3.20 |
| TEG2250 | 0.16 | 0.16 | | 1.00 | 0.32 |
| PI | 0.32 | 0.32 | | 2.00 | 0.64 |
| MP | 30.52 | | 30.52 | 0.00 | 6.80 |

TABLE 3-continued

| | CHARGE, g | SOLIDS, g | SOLVENT | WT. % SOLIDS | WT. % OF COATING SOLUTION |
|---|---|---|---|---|---|
| PREPARATIVE EXAMPLES 35-46 | | | | | |
| PREPARATIVE EXAMPLE OLIGOMER | 7.464 | 7.464 | | 93.30 | 29.86 |
| HDDA | 0.16 | 0.16 | | 2.00 | 0.64 |
| SR611 | 0.16 | 0.16 | | 2.00 | 0.64 |
| TEG2100 | 0.056 | 0.056 | | 0.70 | 0.22 |
| PI | 0.16 | 0.16 | | 2.00 | 0.64 |
| MP | 17 | | 17 | 0.00 | 68.00 |
| PREPARATIVE EXAMPLES 47-55C | | | | | |
| PREPARATIVE EXAMPLE OLIGOMER | 9.33 | 7.464 | 1.866 | 93.30 | 37.32 |
| HDDA | 0.16 | 0.16 | | 2.00 | 0.64 |
| SR611 | 0.16 | 0.16 | | 2.00 | 0.64 |
| TEG2100 | 0.056 | 0.056 | | 0.70 | 0.22 |
| PI | 0.16 | 0.16 | | 2.00 | 0.64 |
| MP | 15.134 | | 15.134 | 0.00 | 60.54 |

TABLE 4

| PREPARATIVE EXAMPLE HARD COATED FILMS | PREPARATIVE EXAMPLE OLIGOMER |
|---|---|
| PE18 | PE1 |
| PE19 | PE2 |
| PE20 | PE3 |
| PE21 | PE4 |
| PE22 | PE5 |
| PE23 | PE6 |
| PE24 | PE7 |
| PE25 | PE8 |
| PE26 | PE9 |
| PE27 | PE10 |
| PE28 | PE11 |
| PE29 | PE12 |
| PE30 | PE13 |
| PE31 | PE14 |
| PE32 | PE15 |
| PE33 | PE16 |
| PE34 | PE17 |
| PE35 | EBECRYL 225 |
| PE36 | EBECRYL 1290 |
| PE37 | EBECRYL 8301R |
| PE38 | EBECRYL 8602 |
| PE39 | EBECRYL 8604 |
| PE40 | GENOMER 4690 |
| PE41 | CN968 |
| PE42 | CN9006 |
| PE43 | CN9010 |
| PE44 | CN9013 |
| PE45 | CN9025 |
| PE46 | CN9039 |
| PE47 | PE1 |
| PE48 | PE1 |
| PE49 | PE2 |
| PE50 | PE3 |
| PE51 | PE4 |
| PE52 | PE7 |
| PE53 | PE8 |
| PE54 | PE11 |
| PE55 | PE12 |
| PE55A | UVHC 3000 |
| PE55B | UVHC 5000 |
| PE55C | uncoated PC film |

Thermoforming of the Preparative Examples PE18-PE55C to generate thermoformed PE56-93C was performed using a MAAC sheet feed vacuum thermoforming system (MAAC Machinery Corp., Carol Stream, Ill.). The thermoforming system clamped the coated film sheet to be thermoformed, and the sheet was shuttled between top and bottom heating elements to heat the sheet to a temperature of 340° F. (171° C.) to 380° F. (193° C.). The heated sheet was then shuttled over the top of a forming tool with the 8 base lens geometry (resulting in the outer profile shown in FIGS. 3A-3C, for the outer surface 390 of infrared-reflecting lens assembly 300, where the length of the mold cavity was 8 mm and the width was 65 mm. The tool was heated to a temperature of 150° F. (121° C.) to 250° F. (121° C.). Then, the tool was raised into the sheet and vacuum was pulled to force the heated sheet to form to the 8 base lens tool geometry.

Test results for films used for thermoforming are reported in Table 5, below.

TABLE 5

| FILM USED | INITIAL HAZE, haze units | ABRASION TEST Δ HAZE, haze units | TRANSMISSION AFTER ABRASION TEST, % | % LOSS IN TRANSMISSION AFTER ABRASION TEST, % | ADHESION TEST RATING |
|---|---|---|---|---|---|
| PE18 | 0.1 | 26.00 | 90.9 | 1.7 | 5B |
| PE19 | 0.18 | 21.32 | 90.8 | 1.7 | 5B |
| PE20 | 0.13 | 23.47 | 90.7 | 1.8 | 5B |
| PE21 | 0.1 | 26.00 | 90.7 | 1.9 | 4B |
| PE22 | 0.14 | 32.96 | 90.5 | 2 | 3B |
| PE23 | 0.12 | 42.68 | 90.6 | 1.9 | 4B |
| PE24 | 0.42 | 22.98 | 90.8 | 1.7 | 5B |
| PE25 | 0.15 | 19.95 | 90.6 | 1.9 | 5B |
| PE26 | 0.18 | 42.62 | 90.5 | 1.9 | 5B |
| PE27 | 0.45 | 26.25 | 90.6 | 2 | 5B |
| PE28 | 0.12 | 35.88 | 90.4 | 2.1 | 5B |
| PE29 | 0.11 | 37.89 | 90.4 | 2.1 | 5B |
| PE30 | 0.12 | 34.18 | 90.6 | 1.8 | 5B |
| PE31 | 0.11 | 27.19 | 90.7 | 1.9 | 5B |
| PE32 | 0.25 | 34.35 | 90.6 | 2 | 5B |
| PE33 | 0.36 | 9.57 | 91 | 1.6 | 5B |
| PE34 | 0.54 | 9.03 | 91.1 | 1.4 | 5B |
| PE35 | 0.11 | 2.43 | 91.1 | 1.7 | 5B |
| PE36 | 0.1 | 4.27 | 91.2 | 1.5 | 5B |
| PE37 | 0.11 | 9.3 | 91.0 | 1.7 | 5B |
| PE38 | 0.12 | 3.92 | 91.1 | 1.6 | 5B |
| PE39 | 0.14 | 13.6 | 90.9 | 1.8 | 5B |
| PE40 | 0.11 | 7.81 | 91.1 | 1.6 | 5B |
| PE41 | 0.10 | 4.91 | 91.1 | 1.6 | 5B |
| PE42 | 0.10 | 5.7 | 91.1 | 1.5 | 5B |
| PE43 | 0.10 | 5.35 | 91.2 | 1.5 | 5B |
| PE44 | 0.10 | 2.77 | 91.2 | 1.4 | 5B |
| PE45 | 0.10 | 31.6 | 91.1 | 1.7 | 5B |
| PE46 | 0.11 | 4.79 | 91.2 | 1.4 | 5B |
| PE47 | 0.13 | 6.6 | 91.0 | 1.7 | 5B |
| PE48 | 0.17 | 5.09 | 90.9 | 1.8 | 5B |
| PE49 | 0.1 | 3.68 | 90.9 | 1.8 | 5B |
| PE50 | 0.13 | 4.13 | 90.9 | 1.9 | 5B |
| PE51 | 0.12 | 10.08 | 90.7 | 2.1 | 5B |
| PE52 | 0.13 | 4.43 | 90.8 | 1.8 | 5B |
| PE53 | 0.12 | 7.14 | 90.7 | 2 | 5B |
| PE54 | 0.15 | 15.25 | 90.6 | 2.3 | 5B |
| PE55 | 0.15 | 21.15 | 90.4 | 2.3 | 5B |
| PE55A | 0.17 | 9.20 | 91 | 1.4 | 5B |
| PE55B | 0.15 | 13.35 | 91.1 | 1.3 | 5B |
| PE55C | — | 56.38 | — | — | N/A |

Thermoforming results are reported in Table 6, below.

TABLE 6

| THERMOFORMED PREPARATIVE EXAMPLE | PREPARATIVE EXAMPLE USED FOR THERMOFORMING | THERMOFORMING RESULTS |
|---|---|---|
| PE56 | PE18 | no cracks |
| PE57 | PE19 | minor cracks on optical surface |
| PE58 | PE20 | no cracks |
| PE59 | PE21 | no cracks |
| PE60 | PE22 | no cracks |
| PE61 | PE23 | no cracks |
| PE62 | PE24 | cracks on optical surface |
| PE63 | PE25 | no cracks |
| PE64 | PE26 | no cracks |
| PE65 | PE27 | no cracks |
| PE66 | PE28 | no cracks |
| PE67 | PE29 | no cracks |
| PE68 | PE30 | no cracks |
| PE69 | PE31 | no cracks |
| PE70 | PE32 | no cracks |
| PE71 | PE33 | no cracks |
| PE72 | PE34 | no cracks |
| PE73 | PE35 | cracks 80% up from edge |
| PE74 | PE36 | cracks 60% up from edge |
| PE75 | PE37 | cracks 70% up from edge |
| PE76 | PE38 | cracks 70% up from edge |
| PE77 | PE39 | no cracks |
| PE78 | PE40 | cracks 60% up from edge |
| PE79 | PE41 | cracks 70% up from edge |
| PE80 | PE42 | cracks 70% up from edge |
| PE81 | PE43 | cracks 60% up from edge |
| PE82 | PE44 | cracks 60% up from edge |
| PE83 | PE45 | no cracks |
| PE84 | PE46 | cracks 80% up from edge |
| PE85 | PE47 | cracks at edge only |
| PE86 | PE48 | cracks at edge only |
| PE87 | PE49 | cracks 30% up from edge |
| PE88 | PE50 | cracks 25% up from edge |
| PE89 | PE51 | cracks at edge only |
| PE90 | PE52 | cracks 25% up from edge |
| PE91 | PE53 | cracks at edge only |
| PE92 | PE54 | no cracks |
| PE93 | PE55 | no cracks |
| PE93A | PE55A | cracks on optical surface |
| PE93B | PE55B | cracks on optical surface |
| PE93C | PE55C | no cracks |

Examples PE94-PE96

For making the coating formulation, 14.73 g of pre-made urethane acrylate (1.0 DESN100+0.5 HEA+0.5 PETA, 80 wt % in MEK, described previous context), 0.14 g of TEG2100, 0.27 g of ESACURE ONE and 20.32 g of ethanol and 2.54 g of MP were mixed and stirred with a magnetic stir bar at room temperature for 30 min, followed by adding 2.00 g of SR611 solution (32 wt % in ethanol). Films PE94, PE95, and PE96 were made by applying the coating formulation on PC films using #7, #9, #12 Mayer rod, respectively. The coated PC films were allowed to dry at room temperature and then dried at 80° C. in an oven for 1 min. The dried samples were cured using a UV processor equipped with an H-type bulb (Heraeus Noblelight America (Fusion UV Systems), Gaithersburg, Md.) at 100% power under nitrogen purge at 30 feet/min (12.1 m/min).

Test results for Examples PE94-PE96 are reported in Table 7, below.

TABLE 7

| PE FILM USED | % HAZE | | | HAZEGUARD % TRANSMISSION | | |
|---|---|---|---|---|---|---|
| | Initial | Abraded | Δ Haze | Initial | Abraded | Δ Transmission |
| PE94 | 0.16 | 5.66 | 5.50 | 91.7 | 91.5 | −0.2 |
| PE95 | 0.13 | 7.00 | 6.87 | 91.6 | 91.4 | −0.2 |
| PE96 | 0.15 | 5.99 | 5.84 | 91.5 | 91.4 | −0.1 |

Examples 1-4

Laminated films were constructed by laminating PC film to IRMOF film using OCA transfer adhesive tape. Similarly, the PC film surface of Preparative Example PE18, PE20, PE25, and PE34, were separately laminated to the IRMOF using OCA transfer adhesive tape. The resulting constructions were formed to shape with the same thermoforming process as described in prior sampling using a MAAC vacuum thermoforming machine and the 8 Base lens tool.

Optical film insert molding was done on a Krauss Maffei 65 ton injection molding machine using an 8 Base lens blank injection molding tool. The process of optical film insert molding involved trimming the formed laminate film to the correct size to fit in the injection molding tool. The films were inserted in the convex side of the injection molding tool and polycarbonate molding material (MAKROLON 2407 polycarbonate, Covestro, Pittsburgh, Pa.) injected into the molding tool cavity at 250° F. (° C.). The resultant lens assembly had the geometry shown in FIGS. 3A-3C. For examples 1-4 no cracks were found in the thermoforming of any of the hardcoated films, and no cracking was seen in the lens with the Optical film insert.

Examples 5-7

Optical film insert molding was done on a Krauss Maffei 65 ton injection molding machine using an 8 Base lens blank injection molding tool. The process of optical film insert molding involved trimming the formed films to the correct size to fit in the injection molding tool. The films with hard coated surfaces were inserted in the convex side and the concave side of the injection molding tool and polycarbonate molding material (MAKROLON 3107 polycarbonate, Covestro, Pittsburgh, Pa.) injected into the molding tool cavity at 250° F. (° C.). For examples 5-7 no cracks were found in the thermoforming of any of the hardcoated films, and no cracking was seen in the lens with the optical film insert.

Test results for Examples 1-4 and 5-7 are reported in Table 8, below.

TABLE 8

| EXAMPLE | PE FILM USED | % HAZE | | | HAZEGUARD % TRANSMISSION | | |
|---|---|---|---|---|---|---|---|
| | | Initial | Abraded | Δ Haze | Initial | Abraded | Δ Transmission |
| 1 | PE18 | 0.1 | 26.9 | 26.8 | 84.1 | 84.6 | <0.5% |
| 2 | PE20 | 2.5 | 15.5 | 13 | 85.1 | 86.2 | <0.5% |
| 3 | PE25 | 0.5 | 22.9 | 22.4 | 81.4 | 85.8 | <0.5% |
| 4 | PE34 | 3.6 | 26.3 | 22.7 | 84.9 | 81.7 | <0.5% |
| 5 | PE94 | 2.12 | 13.9 | 11.78 | 88.1 | 83.6 | −4.5 |
| 6 | PE95 | 2.68 | 11 | 8.32 | 88.3 | 84.1 | −4.2 |
| 7 | PE96 | 2.48 | 10.5 | 8.02 | 88.9 | 84.8 | −4.1 |

Optical properties of the Examples 1-4 are reported in Table 8, below.

TABLE 9

| EXAMPLE | PE FILM USED | Left Band Edge, nm | Right Band Edge, Nm | $T_L$, % | $T_{IR}$, % |
|---|---|---|---|---|---|
| 1 | PE18 | 775 | 1374 | 85.9 | 0.02 |
| 2 | PE20 | 764 | 1354 | 85.0 | 0.02 |
| 3 | PE25 | 771 | 1368 | 80.9 | 0.02 |
| 4 | PE34 | 777 | 1378 | 85.5 | 0.02 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An infrared-reflecting optically transparent assembly comprising:
   a first optically transparent thermoplastic polymer film having first and second opposed major surfaces;
   a first protective coating disposed on at least a portion of the first major surface of the first optically transparent thermoplastic polymer film, wherein the first protective coating comprises an at least partially cured first composition comprising:
   a) 70 to 95 weight percent of urethane (meth)acrylate compound having an average (meth)acrylate functionality of 3 to 9, based on the total weight of components a) to d);
   b) 2 to 20 weight percent (meth)acrylate monomer having a (meth)acrylate functionality of 1 to 2, based on the total weight of components a) to d), wherein the (meth)acrylate monomer is not a urethane (meth)acrylate compound;
   c) 0.5 to 2 weight percent of silicone (meth)acrylate, based on the total weight of components a) to d); and
   d) optional effective amount of photoinitiator; and
   a first major surface of an infrared-reflecting multilayer optical film securely bonded to at least a portion of the second major surface of the first optically transparent thermoplastic polymer film.

2. The infrared-reflecting optically transparent assembly of claim 1, wherein the urethane (meth)acrylate compound has an average (meth)acrylate functionality of 4 to 7.

3. The infrared-reflecting optically transparent assembly of claim 1, wherein the thermoplastic polymer film comprises a polycarbonate.

4. The infrared-reflecting optically transparent assembly of claim 1, wherein component d) is present in the curable composition.

5. The infrared-reflecting optically transparent assembly of claim 1, wherein component b) comprises at least one of 1,6-hexanediol di(meth)acrylate or an alkoxylated tetrahydrofurfuryl (meth)acrylate.

6. The infrared-reflecting optically transparent assembly of claim 1, wherein in component a) the urethane (meth)acrylate compound includes at least one of an isocyanurate ring or a biuret group.

7. The infrared-reflecting optically transparent assembly of claim 1, further comprising:
   a second optically transparent thermoplastic polymer film securely bonded to a second major surface of the infrared-reflecting multilayer optical film opposite the first optically transparent thermoplastic polymer film.

8. The infrared-reflecting optically transparent assembly of claim 1, wherein the infrared-reflecting optically transparent assembly is shaped into the contour of a lens surface.

9. The infrared-reflecting optically transparent assembly of claim 8, wherein the infrared-reflecting optically transparent assembly is coextensive with the lens surface.

10. An infrared-reflecting lens assembly comprising:
    the infrared-reflecting optically transparent assembly of claim 8 secured to a thermoplastic polymer lens.

11. A method of making an infrared-reflecting optically transparent assembly, the method comprising steps:
    i) providing a curable composition comprising components:
       a) 70 to 95 weight percent of urethane (meth)acrylate compound having an average (meth)acrylate functionality of 3 to 9, based on the total weight of components a) to d);
       b) 2 to 20 weight percent (meth)acrylate monomer having a (meth)acrylate functionality of 1 to 2, based on the total weight of components a) to d), wherein the (meth)acrylate monomer is not a urethane (meth)acrylate compound;
       c) 0.5 to 2 weight percent of silicone (meth)acrylate, based on the total weight of components a) to d);
       d) optional effective amount of photoinitiator; and
       e) optional solvent;
    ii) coating the curable composition onto a major surface of an optically transparent thermoplastic polymer film;
    iii) optionally at least partially drying the curable composition to provide an at least partially dried curable composition;
    iv) at least partially curing the curable composition or the at least partially dried curable composition to provide a thermoformable composite film; and
    v) laminating the thermoformable composite film to an infrared-reflecting multilayer optical film to provide the infrared-reflecting optically transparent assembly.

12. The method of claim 11, wherein the urethane (meth)acrylate compound has an average (meth)acrylate functionality of 4 to 7.

13. The method of claim 11, wherein the thermoplastic polymer film comprises a polycarbonate.

14. The method of claim 11, wherein component d) is present in the curable composition.

15. The method of claim 11, wherein component e) is present in the curable composition.

16. The method of claim 11, wherein component b) comprises at least one of 1,6-hexanediol di(meth)acrylate or an alkoxylated tetrahydrofurfuryl (meth)acrylate.

17. The method of claim 11, wherein in component a) the urethane (meth)acrylate compound includes at least one of an isocyanurate ring or a biuret group.

18. The method of claim 11, further comprising:
    vi) shaping the infrared-reflecting optically transparent assembly.

19. The method of claim 18, wherein said shaping comprises thermoforming.

20. A method of making an infrared-reflecting lens assembly, the method comprising steps:
    placing an infrared-reflecting optically transparent assembly according to claim 8 into a lens-shaped injection mold cavity;
    injecting molten thermoplastic polymer into the injection mold cavity; and
    removing the infrared-reflecting lens assembly from the injection mold cavity.

* * * * *